(No Model.)

H. WILCOX.
TOOL FOR EXPANDING HORSESHOES.

No. 337,221. Patented Mar. 2, 1886.

WITNESSES
John Becker
Jno. E. Gavin

INVENTOR
Harvey Wilcox
by Chas. M. Higgins
Attorney

UNITED STATES PATENT OFFICE.

HARVEY WILCOX, OF ELIZABETH, NEW JERSEY.

TOOL FOR EXPANDING HORSESHOES.

SPECIFICATION forming part of Letters Patent No. 337,221, dated March 2, 1886.

Application filed November 9, 1885. Serial No. 182,163. (No model.)

*To all whom it may concern:*

Be it known that I, HARVEY WILCOX, of Elizabeth, Union county, New Jersey, have invented certain new and useful Improvements in Tools for Expanding Horseshoes on Horses' Feet, of which the following is a specification.

It is well known that by abnormal growth or use the hoofs of horses often tend to contract so as to close up the frog of the foot, which contraction causes pressure on the "coffin-bone" within the hoof, and thus produces great irritation, which results in "soft feet" and lameness, and often renders the horse worthless. To obviate this trouble, the hoof is first shod with a shoe having prongs or flanges at the heels, which flanges engage with the heels of the hoof, and the shoe is then expanded when thus nailed on the hoof, which thereby expands the hoof at the heels, and thus opens the frog to the required extent, and prevents the irritation, and will finally correct the false growth of the hoof.

My invention consists, mainly, in the improved form of expanding-tool, which consists of two parallel lever-bars pivoted together at one end and formed with knife-edge tips at the opposite end, adapted to be inserted between the prongs of the horseshoe and bear thereon. Said levers, being connected by an expanding-screw, may be diverged, and thereby expand the prongs of the shoe to the desired extent, the knife-edge tips of the jaws embedding themselves in the metal sufficiently to prevent slipping during the expanding operation.

My invention also consists in the special construction of the parts, as hereinafter set forth.

Figure 1:
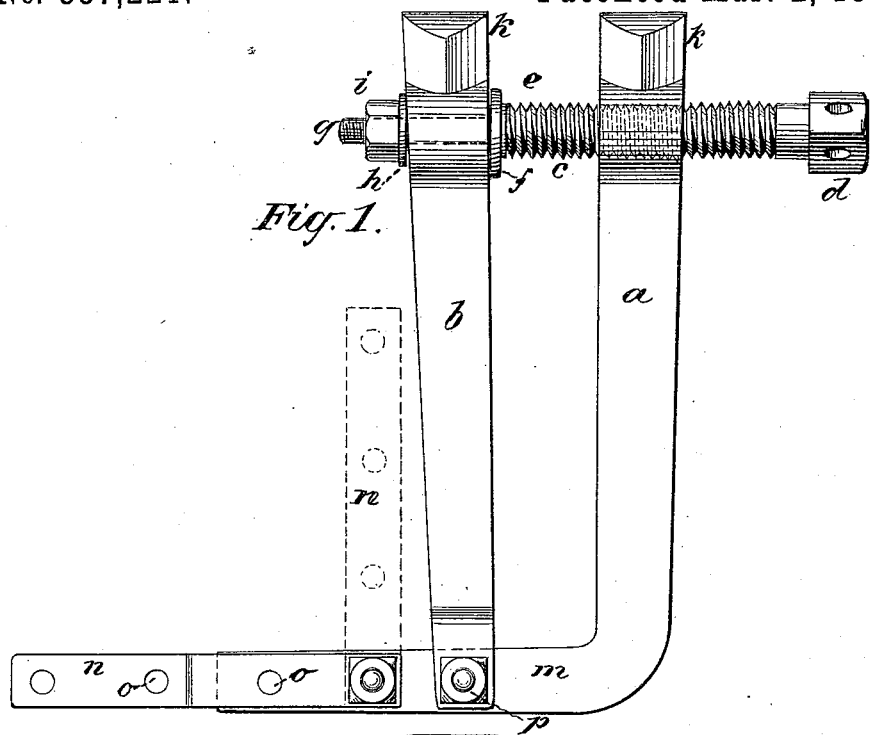
Figure 2:
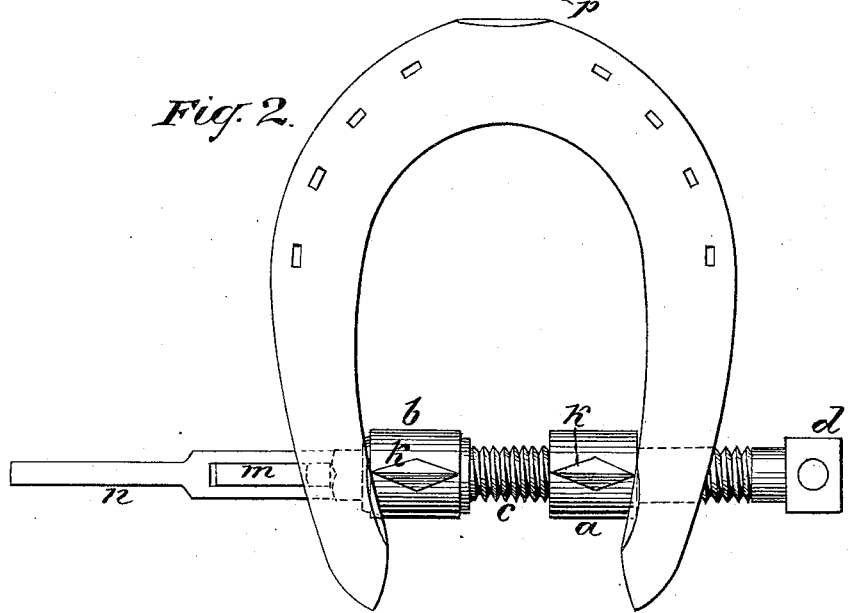

In the drawings annexed, Figure 1 presents a side elevation of my improved expanding-tool; and Fig. 2 is a plan view thereof shown inserted in a horseshoe, which is viewed from its upper side, which fits to the hoof.

In Fig. 1, $a$ indicates what may be termed the "main" or "primary" jaw of the tool, and $b$ the "movable" or "secondary" jaw, both of which are made in the form of lever-bars pivoted together, so that they may be spread apart or forced together.

$c$ is an expanding-screw, which operatively connects the jaws. This screw has a square and perforated head, $d$, at its manipulating end, to receive a wrench or wrench-bar, and its threaded part screws through a threaded aperture in the jaw $a$, while a shoulder, $e$, at its tip abuts against a washer, $f$, which bears against the jaw $b$, while the narrow stem $g$ passes loosely through a slightly-elongated hole in the jaw $b$, and receives a washer and nut, $h$ $i$, which bear on the opposite side of the jaw $b$, as well shown in Fig. 1. It will therefore be seen that by turning the screw one way or the other the jaws will be closed together or moved apart with great force. Now, the tips of the jaws $a$ $b$ are formed with narrow and sharp-edged prongs or tines $k$ $k$, adapted, when the jaws are contracted, to enter the inside of the shoe, as seen in Fig. 2, and bear with one of their sharp edges upon the prongs of the horseshoe at or near the heels, as seen in Fig. 2. When the jaws are thus placed within the shoe after the shoe has been nailed to the horse's hoof, it will be seen that by turning the screw $d$ with a wrench in the proper direction the jaws $a$ $b$ will be diverged, and the sharp knife-edge tips $k$ $k$ bearing on the sides of the shoe will force the sides apart, bending the shoe slightly at the arch, and thus expanding the shoe, and with it the hoof, and thereby opening the frog to the desired extent and relieving the contraction. It will be readily appreciated that by this means the shoe can be very easily expanded to any desired degree at any time, and the expansion can be made gradual or by degrees each day until the frog is sufficiently expanded or until a cure is effected by the corrected growth of the hoof which is thus established. The narrow tips of the jaws enable them to be readily inserted in the shoe and to take a bearing at the best point, and their sharp edges enable them to become embedded sufficiently in the metal to prevent displacement or slippage, and insure instant correct action as soon as the screw is tightened, without liability of derangement. When the screw has been turned sufficiently far to effect the desired expansion on that shoe, a turn or two of the screw in the reverse direction will release the jaws, and allow the tool to be removed from the shoe, ready to be applied in the same way to the next shoe requiring expansion.

I prefer to make the jaw $a$ with a prolongation, $m$, extending at right angles to and beyond the jaw b, and on which the jaw b is pivoted. On this prolongation I also prefer to pivot a folding bar, n, which may be swung down at right angles to the jaws in line with the prolongation m, as shown by full lines in Fig. 1, or may be folded up in line with the jaw b, as indicated by dotted lines in Fig. 1. In this folding or extension bar n are formed a number of additional pivot-holes, o, so that when it is desired to open the jaws very wide the jaw b and its pivot-bolt p may be shifted to one of the holes o. By this means the jaws can be opened wide enough to span the outside of the horseshoe, and as the tips k k have sharp edges on opposite sides, or are preferably of diamond shape, as seen in Fig. 2, the tips will also take a firm bearing on the outside of the shoe, and by turning the screw c outward the jaws may be forced together to contract the shoe, in case it is found necessary at any time to do so by reason of having expanded the shoe too much, or for any other reason, as will be readily understood. It will, however, seldom be required to extend the jaws, as described, for contracting the shoe, and it will be seen that by having the bar n fold up, as shown, the tool becomes more shapely and compact, and is more readily carried.

The jaws a b may be made of cast or wrought iron, and in that case I prefer to insert steel blades in the tips to form the sharp gripping-edges thereof; but the entire jaw and tip may be made of steel duly tempered at the tips, as will be understood.

I am aware that devices for expanding horseshoes have been made with movable jaws connected by an expanding-screw; but I am not aware that any device has been made with two lever-bars connected by an expanding-screw, the levers being pivoted together at one end and formed with knife-edge tips at the opposite end to enter the horseshoe, as in my invention, which thus provides a tool of simple construction with a powerful leverage. Moreover, my tool is easily applied to the horseshoe at any desired point, and will take a firm bearing thereon at two points only and without liability of slippage, which is due to the narrow knife-edge form of the engaging tips, whereas parallel sliding jaws made with broad serrated engaging faces, as heretofore, cannot be applied to the horseshoe so easily at any point desired, and are more liable to slip and prevent the accurate expansion of the hoof at the particular points required.

What I claim is—

1. The combination, with the pivoted lever-jaws $a\,b$, having the knife edge tips $k\,k$, of the screw $c$, screwing through one jaw and bearing on the other, substantially as shown and described.

2. The combination of the pivoted jaws $a\,b$, tips $k\,k$, screw $c$, and folding extension bar $n$, substantially as shown and described.

HARVEY WILCOX.

Witnesses:
JNO. E. GAVIN,
JOHN BECKER.